Aug. 18, 1953     C. B. JOHNSON     2,649,274
PLUG VALVE BODY

Filed Aug. 20, 1948     2 Sheets-Sheet 1

INVENTOR
Charles B. Johnson

Strauch & Hoffman
ATTORNEYS

Aug. 18, 1953     C. B. JOHNSON     2,649,274
PLUG VALVE BODY
Filed Aug. 20, 1948     2 Sheets—Sheet 2
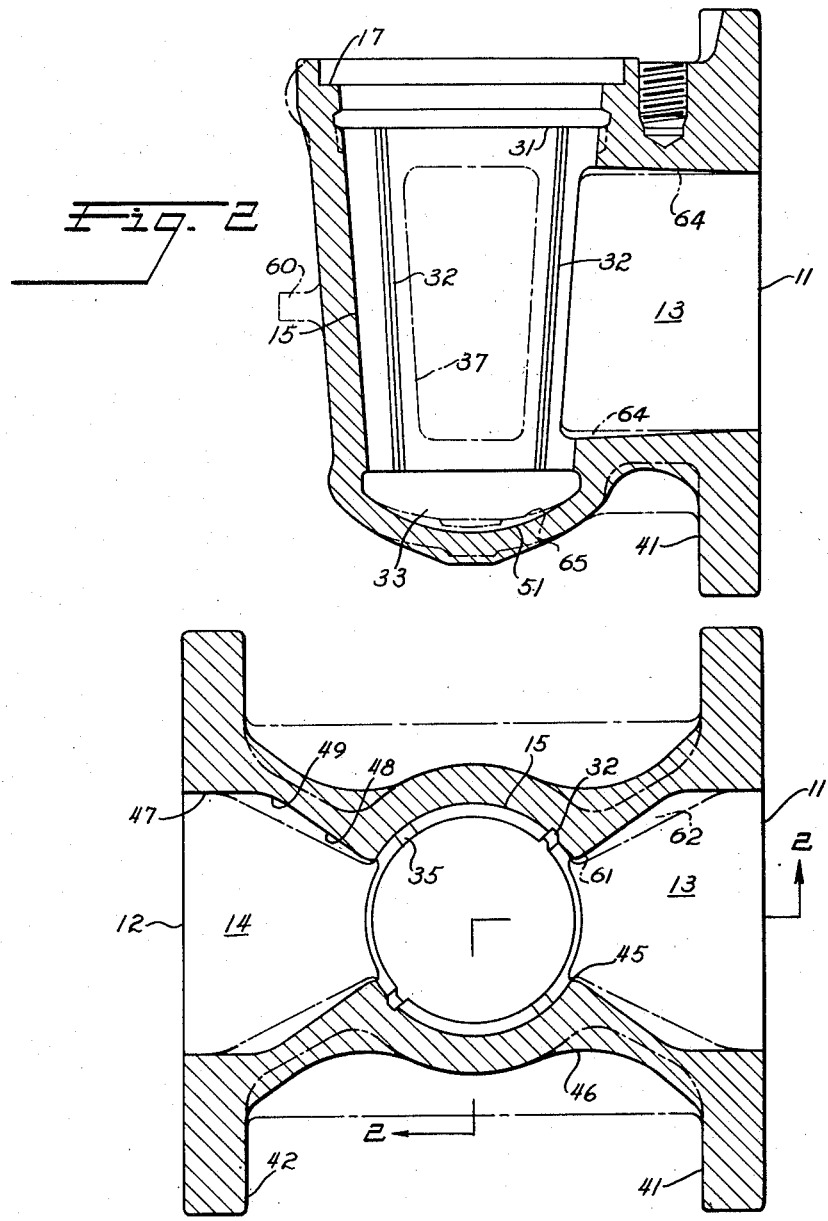
INVENTOR
Charles B. Johnson
Strauch & Hoffman
ATTORNEYS Patented Aug. 18, 1953

2,649,274

UNITED STATES PATENT OFFICE 2,649,274

PLUG VALVE BODY

Charles B. Johnson, Pittsburgh, Pa., assignor to Rockwell Manufacturing Company, Pittsburgh, Pa., a corporation of Pennsylvania Application August 20, 1948, Serial No. 45,339

1 Claim. (Cl. 251—93)

The present invention relates to plug valves.

Plug valves have a wide variety of uses and are often subjected to a variety of internal and external stresses. Such valves are often used to control the flow of fluids at very high pressures and temperatures and often severe mechanical stresses are imposed on the valve through the connecting pipes and fittings.

The inner walls of such valves are necessarily of irregular shape especially adjacent the plug and heretofore, the outer walls have closely followed the configuration of the inner walls. In order to give these valves sufficient strength to withstand the stresses of operation, it has been necessary to employ reinforcing ribs with the result that the valves have been heavy and expensive and difficult to manufacture.

I have found that the weaknesses of prior valves have been due to concentration of stresses at various points and that by distributing those stresses over a larger area of the valve, the reinforcing ribs may be eliminated, the valve body simplified and the strength maintained even though substantially less metal is used. The redistribution of these stresses also permits the use of a longer plug with a larger opening so that, while less metal is used in the plug, the plug will permit the passage of a greater volume of fluid than prior valves operating under the same conditions.

One of the objects of the present invention is to provide a plug valve of minimum weight for a given strength and size.

Another object is to provide a plug valve in which the plug has a maximum opening for a given strength and size of valve.

A further object is to provide a plug valve in which the stresses of operation and installation are substantially distributed throughout the valve body.

Still another object is to provide a plug valve having a body which is relatively simple and inexpensive to produce.

These and other objects and advantages reside in novel features of construction, arrangement, relation and proportion of parts as will hereinafter be more fully set forth and pointed out in the appended claim.

Referring to the drawing:

Figure 2 is a vertical section of the valve body taken on line 2—2 of Figure 3;

Figure 3 is a horizontal section of the valve body.

Figure 1:
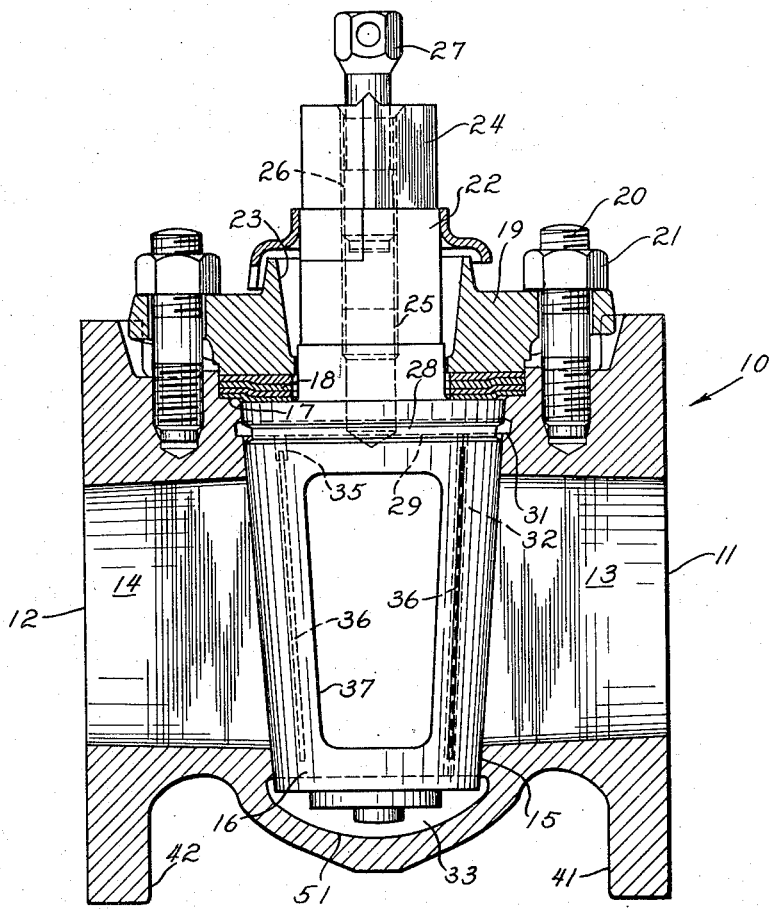
Figure 1 is a vertical section of a plug valve embodying the present invention.

While the present invention is applicable to valves other than plug valves, for the purpose of illustration, it is shown as applied to a lubricated plug valve of the type in which lubricant may be introduced between the plug and the plug seat without removing the plug and in which the plug may be jacked or lifted in the plug seat by lubricant pressure. The lubricant also serves as a seal between the plug and plug seat when the valve is closed. Such valves are well known in the art and one such valve is illustrated in United States Patent No. 1,781,821 issued November 18, 1930 to S. J. Nordstrom.

In the embodiment illustrated, the valve body 10 is provided with axially aligned openings 11 and 12 from which passages 13 and 14 respectively extend to the plug seat 15. This plug seat 15 is perpendicular to the passages 13 and 14 and a plug 16 is rotatably mounted in the plug seat 15. In the embodiment illustrated, the plug 16 and plug seat 15 are tapered but they may also be cylindrical.

The body 10 is formed with a recess 17 surrounding the upper edge of the plug seat 15 to receive packing 18 and a plate 19 secured to the body 10 by bolts 20 and nuts 21 bears against the upper face of the packing 18 to hold the plug 16 firmly in the plug seat 15.

The plug 16 has an extension 22 which projects through an opening 23 in the plate 19 and is provided with a squared portion 24 for attachment of a handle or wrench for turning the plug 16. The extension 22 of the plug 16 is bored to form a lubricant reservoir cell 25, the upper end of which is tapped at 26 and a screw 27 is threaded in the tapped portion 26. A circumferential lubricant groove 28 in the plug 16 is connected to the lubricant cell 25 by passages 29. The lubricant groove 28 is in alinement with a circumferential groove 31 at the upper end of the valve seat 15 and longitudinal grooves 32 in the valve seat 15 connect the circumferential groove 28 with the lubricant chamber 33.

When pressure is applied to lubricant in the cell 25 by the screw 27, lubricant flows from the cell 25 through the passages 29, the aligned circumferential grooves 28 and 31 and along the longitudinal grooves 32 to a lubricant chamber 33 below the plug 16.

The valve body is also provided with two short lubricant grooves 35 which extend a short distance along the plug seat 15 from the circumferential groove 31. The plug 16 is provided with two grooves 36, one on each side of the plug opening 37. These grooves 36 extend along the sides of the plug 16 from the short grooves 35 and terminate below the passages 13 and 14.

When the valve is closed, that is when the plug opening 37 is in the position shown in Figure 1, pressure from the screw 27 causes lubricant from the cell 25 to flow from the circumferential groove 31, through the short grooves 35 and fill the grooves 36. Since there is a groove 36 and a groove 32 on each side of the plug 16, the lubricant in the grooves 32 and 36 forms a seal between the plug 16 and plug seat 15 and prevents leakage around the plug. When the plug 16 is turned, lubricant in the grooves 32 and 36 lubricate the wall of the plug seat 15 and, since the short grooves 35 terminate above the plug opening 37, there is no direct discharge of lubricant from the cell 25 into the passages 13 and 14.

Surrounding the openings 11 and 12 are annular flanges 41 and 42 respectively for securing the valve to a pipe or other fitting not shown. The openings 11 and 12 are usually circular and the plug opening 37 shown in the drawing is of trapezoidal cross section. The plug opening 37 is ordinarily substantially narrower than the openings 11 and 12 so that the side walls of the passages 13 and 14 converge toward the plug seat 15 and meet the plug seat 15 at a relatively sharp edge indicated at 45 in Figure 3. Ordinarily stresses tend to concentrate along the reinforcing flange around the flange fillet of the prior art valve. By forming the outer wall of the housing with a curve of relatively long radius as indicated at 46 opposite the edges 45, the need for a reinforcing rib is eliminated and lengthening the radius of the flange fillet overcomes the stress concentration at that point. The stresses are relatively uniform in a direction parallel to the axis of the plug 16 and the walls of the body are of substantially uniform thickness in a vertical plane but the relatively long radius of curvature at 46 provides additional thickness adjacent the edge 45 and also serves to disperse the stresses over a larger area.

As pointed out above, the passages 13 and 14 converge from the openings 11 and 12 toward the plug seat 15. Most external stresses on the valve are introduced through the flanges 41 and 42. As shown in Figure 3, the passages 13 and 14 have a straight section indicated at 47 which is of greater length than the thickness of the flanges 41 and 42. The converging portions of the passages 13 and 14 indicated at 48 are connected to the straight sections by curved portions 49. The convergence of the portions 48 is relatively sharp and the opening 37 at the top is more than one half the width of the openings 11 and 12.

The plug opening 37 is longer in a vertical direction than the openings 11 and 12 and the top and bottom walls of the passages 13 and 14 diverge from the openings 11 and 12 to the plug seat. Because of its greater width and length, the plug opening 37 offers less resistance to the flow of fluids when the valve is open.

Sometimes when the valve has remained in fixed position for a long period, the plug 16 becomes "frozen" in the seat 15 and very high lubricant pressure in the lubricant chamber 33 is needed to jack the plug from the seat before turning. The stresses due to the lubricant pressure concentrate at the exact center of the lubricant chamber 33 and the chamber wall is made thicker at this point. In order to distribute this pressure as evenly as possible over the entire wall the lubricant chamber 33, the inner wall of the chamber 33, indicated at 51 in Figures 1 and 2 is formed with a relatively short radius of curvature whose center is well below the center of the opening 37 of the plug 16. Tendency of the chamber 33 to crack adjacent the body is thus minimized.

In order to show clearly the advantages of the valve of the present invention over valves of the prior art, Figures 2 and 3 show in phantom lines, the outline of a prior valve. This prior art valve required a reinforcing rib 60, was narrower at the throat 61 and side walls 62 the fluid passages had a longer, less steep taper. In addition the top and bottom walls 64 of the fluid passages were parallel and did not diverge as in the present invention. The wall 65 of the lubricant chamber of the prior art valve had a longer radius of curvature with its center near the center of the plug opening so that lubricant pressure on the lubricant chamber was linear rather than radial as in the present valve.

Throughout the valve of the present invention, sharp corners are avoided and angularly related surfaces are joined by curved surfaces having relatively long radii of curvature. Omission of sharp corners and reinforcing ribs results in a much simpler and less expensive valve body casting.

Valves fabricated in accordance with the present invention have substantially the same mechanical strength, that is, resistance to internal and external stresses as the best prior art valves known. Yet due to the improvements described herein the present valve is approximately 10% lighter than comparable prior art valves and has over 18% greater port area.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a plug valve; a body having an opening; an outwardly projecting flange surrounding said opening; a plug seat extending into said body substantially perpendicular to said opening; a tapered plug rotatably mounted in said plug seat; said plug having an aperture therethrough of substantially less width than said opening; a wall integral with said body closing one end of said plug seat to form a lubricant chamber, the surface of said wall facing said plug seat being an upwardly concave surface of revolution whose center of curvature is substantially on the axis of said plug seat and plug and below the center of the aperture in said plug, said wall being of greater thickness in the center than at the edges; a passage between said opening and said plug seat, the side walls of said passage adjacent said opening having portions substantially parallel adjacent said opening and extending inwardly therefrom a distance greater than the thickness of said flange, said parallel portions being connected by smoothly curved sections to substantially straight portions converging toward said plug seat to substantially the width of said aperture in said plug, the walls of said passage being thinnest adjacent said curved sections, the outer surface of said walls being smoothly curved substantially parallel to the edges of said aperture and having a radius of curvature substantially greater than the thickness of said walls, the top and bottom walls of said passage being substantially straight and diverging uniformly toward said plug seat.

CHARLES B. JOHNSON.

References Cited in the file of this patent

UNITED STATES PATENTS

| Number | Name | Date |
|---|---|---|
| Re. 14,516 | Nordstrom | Aug. 27, 1918 |
| 55,700 | Parsons | June 19, 1866 |
| 144,735 | Brooks | Nov. 18, 1873 |
| 871,956 | Rice | Nov. 26, 1907 |
| 1,571,150 | Trinks | Jan. 26, 1926 |
| 1,683,257 | Nordstrom | Sept. 4, 1928 |
| 2,001,214 | Pelzer | May 14, 1935 |
| 2,088,937 | Aderhold | Aug. 3, 1937 |
| 2,530,744 | Volpin | Nov. 21, 1950 |

FOREIGN PATENTS

| Number | Country | Date |
|---|---|---|
| 783,971 | France | July 20, 1935 |